United States Patent
Liaw et al.

(10) Patent No.: US 9,634,769 B2
(45) Date of Patent: Apr. 25, 2017

(54) COOLERLESS FIBER LIGHT SOURCE DEVICES FOR HARSH ENVIRONMENTS

(71) Applicant: NATIONAL APPLIED RESEARCH LABORATORIES, Taipei (TW)

(72) Inventors: Shien-Kuei Liaw, Taoyuan County (TW); Ren-Young Liu, Hsinchu (TW); Hsiang Wang, New Taipei (TW); Yen-Hung Lu, Tainan (TW)

(73) Assignee: NATIONAL APPLIED RESEARCH LABORATORIES, Taipei (TW)

( * ) Notice: Subject to any disclaimer, the term of this patent is extended or adjusted under 35 U.S.C. 154(b) by 211 days.

(21) Appl. No.: 14/582,422

(22) Filed: Dec. 24, 2014

(65) Prior Publication Data

US 2015/0188640 A1    Jul. 2, 2015

(30) Foreign Application Priority Data

Dec. 27, 2013   (TW) .............................. 102148801 A

(51) Int. Cl.
*H04J 14/02* (2006.01)
*G02B 6/02* (2006.01)
(Continued)

(52) U.S. Cl.
CPC ....... *H04B 10/572* (2013.01); *H01S 3/06795* (2013.01); *H04B 10/503* (2013.01);
(Continued)

(58) Field of Classification Search
CPC .. H04B 10/572; H04B 10/503; H04B 10/291; H01S 3/06795; H01S 3/0064;
(Continued)

(56) References Cited

U.S. PATENT DOCUMENTS 5,894,488 A * 4/1999 Gaiffe ................. H01S 3/06795
                                                              359/337.1
6,144,788 A * 11/2000 Ang ....................... H01S 3/067
                                                              356/477

(Continued)

OTHER PUBLICATIONS

G.M.Williams and E.J. Friebele, "Space Radiation Effects on Erbiumdoped Fiber Devices: Sources, Amplifiers, and Passive Measurements," Nuclear Science, IEEE Transactions on (vol. 45, Issue:3), pp. 1531-1536, Jun. 1998.

*Primary Examiner* — Ken N Vanderpuye
*Assistant Examiner* — Abbas H. Alagheband
(74) *Attorney, Agent, or Firm* — Li & Cai Intellectual Property (USA) Office

(57) ABSTRACT

A robust broadband ASE (amplified spontaneous emission) fiber light source device outputs a light beam which is little affected by temperature and radiation. The light source device is a single-pass backward or double-pass backward architecture, and has a coolerless pump laser and temperature compensated bandpass reflector. The light source device may have a high pass filtering element disposed between the wavelength division multiplexer thereof and the optical isolator thereof, so as to compensate the effect of the temperature to the mean wavelength of the light beam. The specific band of the temperature compensated bandpass reflector which reflects the light beam, and the band which the high pass filtering element transmits the light beam are within the band which the ASE unit amplifies the light beam, and the high pass filtering element mainly absorbs the light beam outside the specific band.

11 Claims, 17 Drawing Sheets

(51) Int. Cl.
  *G02B 6/00* (2006.01)
  *H04B 10/572* (2013.01)
  *H04B 10/50* (2013.01)
  *H01S 3/067* (2006.01)
  *H01S 3/094* (2006.01)
  *H01S 3/0941* (2006.01)
  *H01S 3/16* (2006.01)
  *H01S 3/00* (2006.01)

(52) U.S. Cl.
  CPC ......... *H01S 3/0064* (2013.01); *H01S 3/09415* (2013.01); *H01S 3/094015* (2013.01); *H01S 3/1608* (2013.01)

(58) Field of Classification Search
  CPC ........... H01S 3/094015; H01S 3/09415; H01S 3/1608; H01S 3/067; H01S 3/06754; G01C 19/721; H04J 14/02
  USPC ........ 398/79; 385/31, 38, 39, 123, 122, 147; 372/2, 6
  See application file for complete search history.

(56) References Cited

U.S. PATENT DOCUMENTS

| | | | | |
|---|---|---|---|---|
| 6,658,189 B2 * | 12/2003 | Ajima | ................. | H01S 3/06754 359/341.1 |
| 6,678,087 B1 * | 1/2004 | Masuda | ............. | H01S 3/06754 359/334 |
| 6,744,966 B2 * | 6/2004 | Ang | .................... | G01C 19/721 385/123 |
| 7,636,522 B2 * | 12/2009 | Nagarajan | ............. | B82Y 20/00 398/79 |
| 8,077,747 B2 * | 12/2011 | Schulzgen | ............. | G02B 6/021 372/50.11 |
| 8,526,827 B2 * | 9/2013 | Galarneau | ............... | G02F 1/353 398/173 |
| 8,687,980 B2 * | 4/2014 | Peng | .................... | H04B 10/572 398/196 |
| 2002/0114554 A1 * | 8/2002 | Maroney | ................ | H04J 14/02 385/15 |
| 2003/0091321 A1 * | 5/2003 | Ang | .................... | G01C 19/721 385/147 |
| 2003/0142395 A1 * | 7/2003 | MacCormack | ..... | H01S 3/06754 359/341.3 |
| 2005/0088727 A1 * | 4/2005 | Nakashima | .......... | H04B 10/291 359/341.41 |
| 2008/0130692 A1 * | 6/2008 | Schulzgen | ............. | G02B 6/021 372/6 |
| 2008/0247424 A1 * | 10/2008 | Sacks | .................. | H01S 3/06716 372/6 |
| 2008/0267228 A1 * | 10/2008 | Sacks | ....................... | G02B 6/14 372/6 |
| 2012/0033688 A1 * | 2/2012 | Liaw | ................... | H01S 3/08036 372/20 |
| 2013/0188958 A1 * | 7/2013 | Peng | ...................... | H04J 14/02 398/94 |
| 2013/0293948 A1 * | 11/2013 | Peng | ...................... | H01S 3/067 359/341.3 |

* cited by examiner

US 9,634,769 B2

COOLERLESS FIBER LIGHT SOURCE DEVICES FOR HARSH ENVIRONMENTS

BACKGROUND OF THE INVENTION

1. Field of the Invention

The present disclosure relates to a light source device; in particular, to wide band fiber light source devices employing a coolerless pump laser for harsh environment applications such as over temperature and under radiation.

2. Description of Related Art

Pump lasers are common devices in the fields of optical sensing and communications. A pump laser produces a high efficiency, single color and concentrated light beam. Pump lasers are easily affected by temperature, leading to the mean wavelength and the peak power value of the light beam to move with temperature. In order to decrease the effect of temperature on the mean wavelength and the peak power value of the light beam produced by the pump laser, common solution is to employ a thermoelectric cooler (TEC) to stabilize the pump laser temperature. However, TEC with its associated controlled circuit consumes additional power which is not desirable, especially for space applications.

Broadband ASE (amplified spontaneous emission) fiber light source consisting of a pump laser is a key element of a fiber optic gyroscope or fiber sensors. A fiber optic gyroscope functions based on light beams passing through hundreds to thousands of meters of optic fiber coils and interference resulting therefrom. Two light beams respectively enter two ends of an optic fiber sensing loop at the same time. Due to Sagnac effect, under a condition of clockwise and counterclockwise rotations, the path of one light beam is shorter than that of the other light beam such that phase shifts occur between the two counter-propagating light beams. A synchronous detection can sense the phase shift, thereby obtaining the magnitude and direction of angular rotation. The scale factor of the fiber optic gyroscope is however proportional to the mean wavelength of the wide band ASE light source pumped by the pump laser which is sensitive to temperature if no TEC is used. Therefore the goal is to achieve consistency of the mean wavelength of the broadband ASE light source device when a coolerless pump laser is used. Namely, the mean wavelength and the power value of the broadband ASE light beam pumped by the coolerless pump laser cannot be easily affected by temperature or radiation if the coolerless pump laser is intended for space applications.

Through devoted researches combined with theoretical modelings, the present inventors had demonstrated the present disclosure which employs a coolerless pump laser and achieve mean wavelength and power stability of a broadband ASE fiber light source over harsh temperature and radiation environment.

SUMMARY OF THE INVENTION

The object of the present disclosure is to provide a light source device comprising a plurality of optic fibers, a pump laser without a thermoelectric cooler, a wavelength division multiplexer (WDM), an optical isolator, amplified spontaneous emission (ASE) unit such as rare-earth doped fibers, and a bandpass reflector. The pump laser without a thermoelectric cooler is for providing a first light beam having a mean wavelength in a first band. A first terminal of the wavelength division multiplexer is connected to the pump laser through at least one section of optic fiber. The first terminal of the wavelength division multiplexer receives the first light beam for allowing the first light beam having a mean wavelength in the first band to pass from the first terminal of the wavelength division multiplexer to a common terminal of the wavelength division multiplexer, and to allow a second light beam having a mean wavelength in a second band to pass from the common terminal to a second terminal of the wavelength division multiplexer. The optical isolator is a uni-directional guiding unit, whose first terminal is connected to the second terminal of the wavelength division multiplexer through at least one section of optic fiber. The first terminal of the optical isolator receives the second light beam from the second terminal of the wavelength division multiplexer, and allows the second light beam to pass from the first terminal of the optical isolator to a second terminal of the optical isolator. A first terminal of the amplified spontaneous emission unit (such as rare-earth doped fibers) connects to the common terminal of the wavelength division multiplexer through at least one section of optic fiber. The first light beam having a mean wavelength in the first band excites amplification after being received by the first terminal of the amplified spontaneous emission unit, producing a third light beam to a second terminal of the amplified spontaneous emission unit. A first terminal of the bandpass reflector connects to the second terminal of the amplified spontaneous emission unit through at least one section of optic fiber, and a second terminal of the bandpass reflector connects to at least one section of optic fiber. The first terminal of the bandpass reflector receives the third light beam from the second terminal of the amplified spontaneous emission unit, reflecting the third light beam having a mean wavelength in a specific band back to the first terminal of the bandpass reflector and allowing the third light beam having a mean wavelength outside the specific band to pass from the first terminal of the bandpass reflector to the second terminal of the bandpass reflector. The amplified spontaneous emission unit receives at the second terminal thereof a fourth light beam from the first terminal of the bandpass reflector, producing the second light beam to the first terminal of the amplified spontaneous emission unit.

In an embodiment of the present disclosure, the above light source device can be a broadband light source device employed in fiber optic gyroscopes or in fiber sensing/communication instrument for spacecraft or nuclear facility applications.

In summary of the above, compared to conventional light sources, the light source device provided by the present disclosure uses a coolerless pump laser, providing better mean wavelength consistency across a broad temperature range, and better mean wavelength and power stability under a radiation environment, therefore is well suited for space applications such as fiber optic gryoscopes for space platform stabilization and/or altitude control whereas power consumption and space radiation are key design parameters and constraints.

In order to further the understanding regarding the present disclosure, the following embodiments are provided along with illustrations to facilitate the disclosure of the present disclosure.

DETAILED DESCRIPTION OF THE PREFERRED EMBODIMENTS

Figure 1:
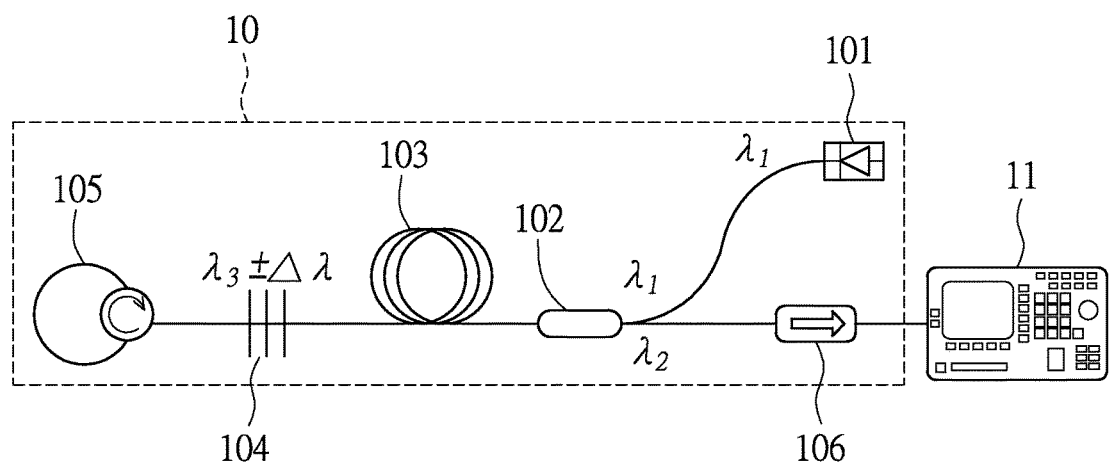
FIG. 1 shows a schematic diagram of a system of a light source device according to an embodiment of the present disclosure.

The present disclosure provides a light source device, specifically, a broadband fiber light source employing a coolerless pump laser to save power dissication. The light source device had achieved excellent mean wavelength and/or power stability over temperature and under radiation through an optical bandpass reflector and a high pass filtering architecture. The banspass reflector employed a unique temperature compensated fiber Bragg grating, whereas the high-pass filtering adopted a piece of fiber absorber such as a rare-earth doped fiber like Erbium doped fiber. The light source device of the present embodiment can be a single-pass backward or double-pass backward architecture. "Backward" means that the travel direction of the light beam provided by the pump laser without a thermoelectric cooler, and the travel direction of the light beam output by the light source device are opposite. "Single-pass" means that only the light beam emitted by the pump laser without a thermoelectric cooler has impact on amplified spontaneous emission unit from one direction. "Double-pass" means that the light beam emitted by the pump laser without a thermoelectric cooler has impact to amplified spontaneous emission unit from both directions and is with the aid of a reflector.

The light source device has a temperature compensated bandpass reflector, which can reflect a light beam in a specific band. "Bandpass" means that the reflecting terminal outputs a light beam in a specific band. The temperature compensated bandpass reflector has an effect of temperature compensation, therefore the specific band (e.g. 1540 nanometers to 1560 nanometers) is not affected by temperature. Namely, the effect of temperature on the mean wavelength of the light beam output by the light source device can be compensated. In an embodiment of the present disclosure, the temperature compensated bandpass reflector can be a temperature compensated grating, such as a temperature compensated fiber Bragg grating (FGB) whose substrate is made of carbon fiber composites, thereby compensating the effect of temperature on the specific band. Furthermore, the light source device can have a high pass filtering element disposed between the wavelength division multiplexer and the optical isolator. The high pass filtering element allows only light beams in the specific band to pass through, and effectively suppresses light beams outside the specific band (e.g. light beam of 1530 nanometers). The high pass filtering element can be for example an optic fiber absorber and have a temperature compensating effect (namely can be a temperature compensated high pass filtering element), such as a temperature compensated optic fiber absorber mounted on the carbon fiber composites substrate. The high pass filtering element can effectively suppress light beams outside the specific band, therefore the effect of temperature on the mean wavelength of the light beam output by the light source device is further compensated.

Specifically, the specific band of the light beam reflected by the temperature compensated bandpass reflector (e.g. 1550 nanometer wavelength) and the band of the light beam mainly suppressed by the high pass filtering element (e.g. 1530 nanometer wavelength) are both within the superfluorescent band of the light beam amplified by the amplified spontaneous emission unit. The high pass filtering element mainly absorbs light beams outside the specific band of the temperature compensated bandpass reflector.

Simply, the light source device of the present embodiment uses different passive temperature compensated units without thermoelectric coolers to stabilize the mean wavelength of the output light beam, such that the mean wavelength of the light beam is not affected by the temperature.

[Embodiment of Light Source Device]

FIG. 1 shows a schematic diagram of a system of a light source device according to an embodiment of the present disclosure. A coolerless light source device 10 includes a plurality of optic fiber sections, a pump laser 101, a wavelength division multiplexer 102, an amplified spontaneous emission unit such as a rare-earth doped fiber 103, a temperature compensated optic fiber Bragg grating 104, an optical circulator (OC) 105, and an optical isolator 106. In the present embodiment, the light source device 10 is a double-pass backward architecture, and the optical circulator 105 serves as a reflecting face. The light source device 10 outputs a light beam whose mean wavelength has little temperature sensitivity. In the present embodiment, an optical spectrum analyzer (OSA) 11 can be connected to the light source device 10 to observe the spectrum and the power of the light beam output by the light source device 10.

A first terminal of the wave division multiplexer 102 is connected to one terminal of the pump laser 101 through at least a section of optic fiber. A second terminal of the wavelength division multiplexer 102 is connected to a first terminal of the optical isolator 106 through at least a section of optic fiber. A common terminal of the wavelength division multiplexer 102 is connected to a first terminal of a rare-earth doped fiber such as an erbium doped optical fiber 103 through at least a section of optic fiber. A first terminal of the temperature compensated optic fiber Bragg grating 104 is connected to a second terminal of the erbium doped optic fiber 103 through at least one section of optic fiber. A second terminal of the temperature compensated optic fiber Bragg grating 104 is connected to a second terminal of the optical circulator 105 through at least a section of optic fiber. A first terminal of the optical circulator 105 is connected to a third terminal of the optical circulator 105 through at least a section of optic fiber. A second terminal of the optical isolator 106 is connected to a unit for receiving the light beam produced by the light source device 10 through at least a section of optic fiber.

The pump laser 101 is preferably a coolerless pump laser. The pump laser 101 provides a light beam having a mean wavelength in a first band $\lambda_1$, which can be for example 800 nanometers, 980 nanometers, or 1480 nanometers. The present disclosure does not limit the wavelength of $\lambda_1$. Additionally, the present disclosure does not limit whether the pump laser 101 is a coolerless laser light source. The pump laser 101 can be a laser light source with a thermoelectric cooler.

The mean wavelength of the light beam allowed by the first terminal of the wavelength division multiplexer to pass through corresponds to the mean wavelength of the light beam produced by the pump laser 101 in the first band $\lambda_1$. The first terminal of the wavelength division multiplexer 102 receives the light beam provided by the pump laser 101, and only allows light beams having wavelengths in the first band $\lambda_1$ to pass the first terminal thereof to the common terminal thereof.

The rare-earth doped fiber such as an erbium doped optic fiber 103 serves as an amplified spontaneous emission unit, producing an amplifying effect when receiving a light beam having a mean wavelength outside a second band $\lambda_2$ (e.g. a light beam having a mean wavelength in the first band $\lambda_1$). The first terminal of the rare-earth doped fiber such as an erbium doped optical fiber 103 receives a light beam having a mean wavelength of the first band $\lambda_1$ from the common terminal of the wavelength division multiplexer 102, exciting the erbium ions such that an amplified spontaneous emission (ASE) occurs, thereby amplifying the light beam, and the light beam is wide band. Of particular note, even though the present embodiment uses the erbium doped optic fiber 103 as an amplified spontaneous emission unit, the present disclosure is not limited thereto, and other devices or units for amplified spontaneous emission can replace the erbium doped optic fiber 103.

The temperature compensated optic fiber Bragg grating 104 serves as a temperature compensated bandpass reflector, namely to realize compensation of temperature. The temperature compensated optic fiber Bragg grating 104 can be a temperature compensated wide band grating, but the present disclosure does not limit the temperature compensated optic fiber Bragg grating 104 to be a wide band temperature compensated grating. The temperature compensated optic fiber Bragg grating 104 is for reflecting light beams having mean wavelengths in the specific band $\lambda_3 \pm \Delta\lambda$, and allows light beams having mean wavelengths outside the specific band $\lambda_3 \pm \Delta\lambda$, to pass from the first terminal thereof to the second terminal thereof, or from the second terminal thereof to the first terminal thereof.

When light beams enter the temperature compensated optic fiber Bragg grating 104 from the first terminal, the temperature compensated optic fiber Bragg grating 104 reflects light beams having mean wavelengths substantially in the specific band $\lambda_3 \pm \Delta\lambda$ to the first terminal thereof, and allows light beams having mean wavelengths substantially outside the specific band $\lambda_3 \pm \Delta\lambda$ to pass from the first terminal thereof to the second terminal thereof. When light beams enter the temperature compensated optic fiber Bragg grating 104 from the second terminal, the temperature compensated optic fiber Bragg grating 104 reflects light beams having mean wavelengths substantially in the specific band $\lambda_3 \pm \Delta\lambda$, to the second terminal thereof, and allows light beams having mean wavelengths substantially outside the specific band $\lambda_3 \pm \Delta\lambda$ to pass from the second terminal thereof to the first terminal thereof. In other words, as mentioned, the temperature compensated optic fiber Bragg grating 104 serves as a temperature compensated bandpass reflector, reflecting light beams having mean wavelengths in the specific band.

In the present embodiment, $\lambda_3$ is for example 1550 nanometers, $\Delta\lambda$ is for example over 5 nanometers, e.g. 20 nanometers. Namely, the temperature compensated optic fiber Bragg grating 104 reflects light beams having mean wavelengths between 1540 nanometers and 1560 nanometers, and only allows light beams having mean wavelengths smaller than 1540 nanometers or greater than 1560 nanometers to pass through. However, the present disclosure does not limit the values of $\lambda_3$ and $\Delta\lambda$. For example, $\lambda_3 + \Delta\lambda$ and $\lambda_3 - \Delta\lambda$ can be respectively 1570 nanometers and 1530 nanometers (namely C band), or respectively 1610 nanometers and 1570 nanometers (namely L band), or respectively 1610 nanometers and 1530 nanometers (namely C and L bands).

The temperature compensated optic fiber Bragg grating 104 can be mounted on a carbon fiber composites substrate, to compensate for the effect of temperature on the mean wavelength of the light beam output by the light source device 10, wherein the angle between the direction of fiber in the stack layers and the direction of fiber in the laminas (e.g. 53 degrees, 67.5 degrees, or preferably 90 degrees) is relevant to the compensation effect.

The second terminal of the optical circulator 105 receives light beams having mean wavelengths of $\lambda_3 \pm \Delta\lambda$ or mean wavelengths outside the specific band $\lambda_3 \pm \Delta\lambda$ from the second terminal of the temperature compensated optic fiber Bragg grating 104, namely receiving light beams reflected by or passed through the temperature compensated optic fiber Bragg grating 104 toward the first terminal, and the light beam is transmitted to the third terminal thereof. The first terminal of the optical circulator 105 receives light beams received by the third terminal thereof, and transmits the light to the second terminal thereof. Simply, in the present embodiment, the optical circulator 105 acts as a reflecting face. Additionally, the optical circulator 105 allows light beams having mean wavelengths in a fourth band $\lambda_4$ to pass through, wherein $\lambda_4$ is for example 1530 nanometers.

Next, the second terminal of the temperature compensated optic fiber Bragg grating 104 receives light beams from the second terminal of the optical circulator 105, and allows light beams having mean wavelengths outside the specific band $\lambda_3 \pm \Delta\lambda$ to pass to the first terminal thereof. The second terminal of the rare-earth doped fiber such as an erbium doped optic fiber 103 receives light beams from the first terminal of the temperature compensated optic fiber Bragg grating 104. The temperature compensated optic fiber Bragg grating 104 allows light beams having mean wavelengths outside the second band $\lambda_2$ to pass from the second terminal thereof to the first terminal thereof, an amplified spontaneous emission occurs again in the rare-earth doped fiber such as an erbium doped optic fiber 103, thereby amplifying the light beam. The common terminal of the wavelength division multiplexer 102 receives the amplified light beam from the first terminal of the rare-earth doped fiber such as an erbium doped optic fiber 103, and allows light beams having mean wavelengths in the second band $\lambda_2$ to pass to the second terminal thereof, wherein the $\lambda_2$ is for example 1550 nanometers but is not limited thereto by the present disclosure.

The optical isolator 106 is a single-pass unit, whose first terminal receives light beams having mean wavelengths in the second band $\lambda_2$ from the second terminal of the wavelength division multiplexer 102 and outputs this light beams to the second terminal thereof. Of particular note, even though the reflector face of the present embodiment is an optical circulator 105, the present disclosure is not limited thereto. In other embodiments of the present disclosure, the reflecting face can be a reflecting mirror, an optical coupler, or a Faraday rotator mirror. The reflecting face can be designed to be a wide band reflecting face, but the present disclosure does not limit whether the reflecting face is a wide band reflecting face. Additionally, the present disclosure does not limit whether the reflecting face is an active, partially passive, or totally reflective reflecting face. Apart from these, the embodiment of the light source device 10 does not limit the present disclosure. For example, the erbium doped optical fiber 103 can be replaced by a temperature compensated erbium doped optic fiber. Even a temperature compensated optic fiber absorber (serving as a high pass filtering element) can be additionally disposed between the wavelength division multiplexer 102 and the optical isolator 106, for further compensating the effect of temperature on the mean wavelength of the beam output by the light source device 10.

Figure 2A:
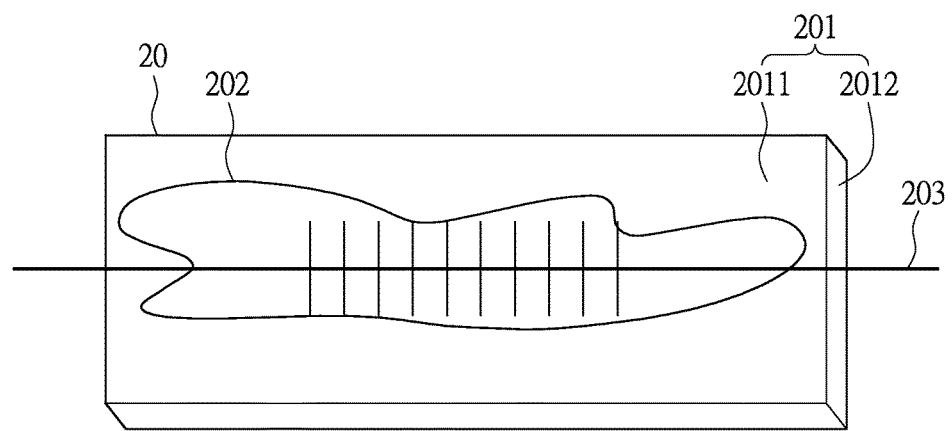
FIG. 2A shows a schematic diagram of a temperature compensated optic fiber Bragg grating according to an embodiment of the present disclosure.

Details of the temperature compensating optic fiber Bragg grating 104 having carbon fiber composites are as follows. FIG. 2A shows a schematic diagram of a temperature compensated optic fiber Bragg grating according to an embodiment of the present disclosure. The temperature compensate optic fiber Bragg grating 20 includes a laminate 201, an optic fiber Bragg grating 202 and an optic fiber 203. The laminate 201 includes single laminas 2011 and stack layers 2012. The single laminas 2011 are disposed on the stack layers 2012, and the single laminas 2011 and the stack layers 2012 are made of carbon composite, such as carbon fiber epoxy resin composite material. The optic fiber Bragg grating 202 is connected to the optic fiber 203. The optic fiber Bragg grating 202 and the optic fiber 203 are attached to an upper surface of the lamina 201. In other words, the temperature compensated optic fiber Bragg grating 20 only compensates for the temperature for the optic fiber Bragg grating 202, and not the unconnected optic fiber 203.

Figure 2B:
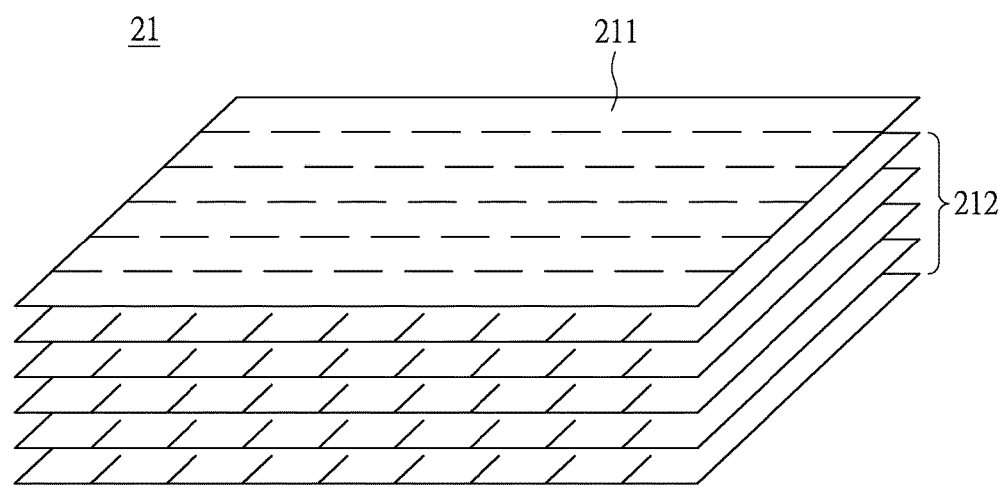
FIG. 2B shows a schematic diagram of laminate according to an embodiment of the present disclosure.

The following describes the lamina 201. FIG. 2B shows a schematic diagram of laminate according to an embodiment of the present disclosure. The direction of the fiber in the lamina 211 of the laminate 21 and the direction of fiber in the stack layers 212 of the laminate 21 have an angle therebetween. This angle affects the effect of compensation. In the present embodiment, the angle between the direction of the fiber in the lamina 211 and the direction of the fiber in the stack layers 212 is 90 degrees. However the present disclosure does not limit the angle between the direction of the fiber in the lamina 211 and the direction of the fiber in the stack layers 212.

Figure 3:
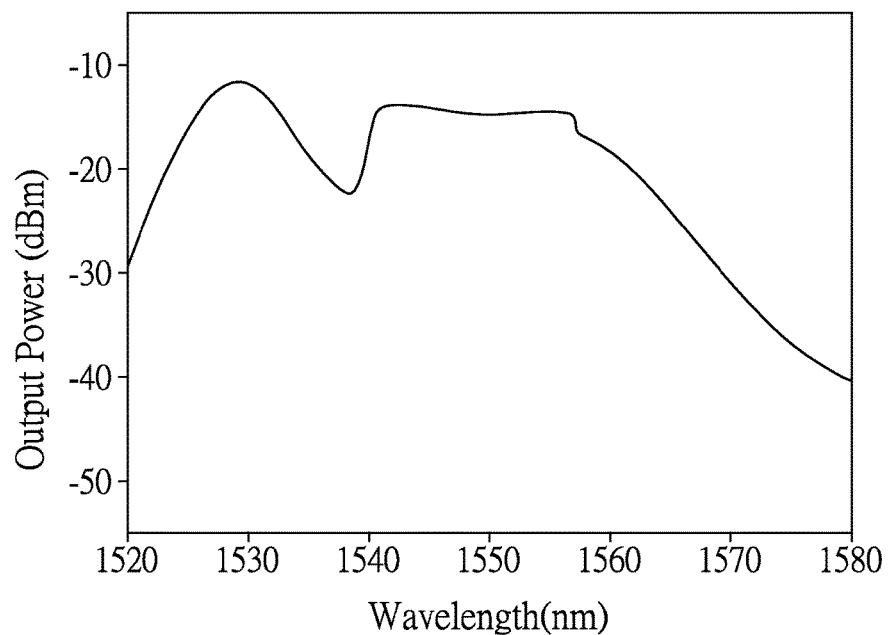
FIG. 3 shows a spectrogram of a light beam emitted by the light source device of the embodiment shown in FIG. 1.

Next, FIG. 3 shows a spectrogram of a light beam emitted by the light source device of the embodiment shown in FIG. 1. The usage of the temperature compensated fiber Bragg grating 104 improves wavelength stability over temperature, and the employment of the optical circulator 105 allows light beams having mean wavelengths in the fourth band $\lambda_4$ which is the 1530 nm band to contribute to bandwidth and output power of the light source device as shown in FIG. 1. Result is the spectra peaking around 1530 nm band, and a flat uniform region between 1540 nm to 1560 nm.

Figure 4:
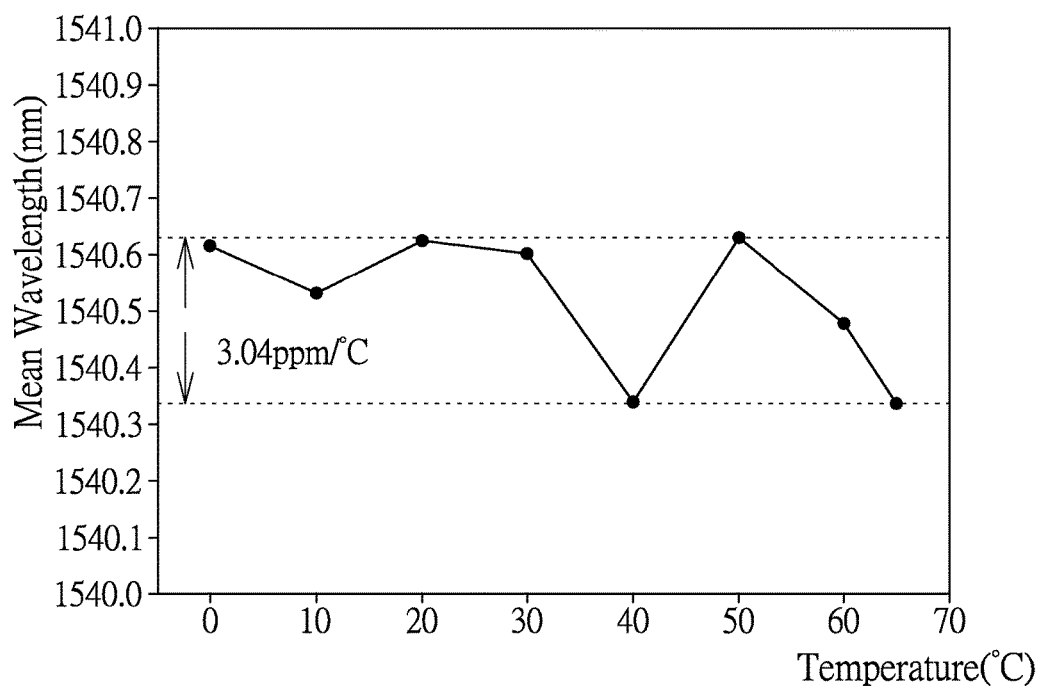
FIG. 4 shows mean wavelengths of light beams emitted by the light source device of the embodiment shown in FIG. 1 as a function of temperature.

Next, FIG. 4 shows mean wavelengths of light beams emitted by the light source device of the embodiment shown in FIG. 1 as a function of temperature. In FIG. 4, when the light source device 10 of FIG. 1 is operated in an environment between 0 and 65 degrees Celsius, its mean wavelength stability can reach 3.04 ppm per degree Celsius corresponding to a peak-to-peak variation of about 20 ppm.

[Another Embodiment of Light Source Device]

Figure 5:
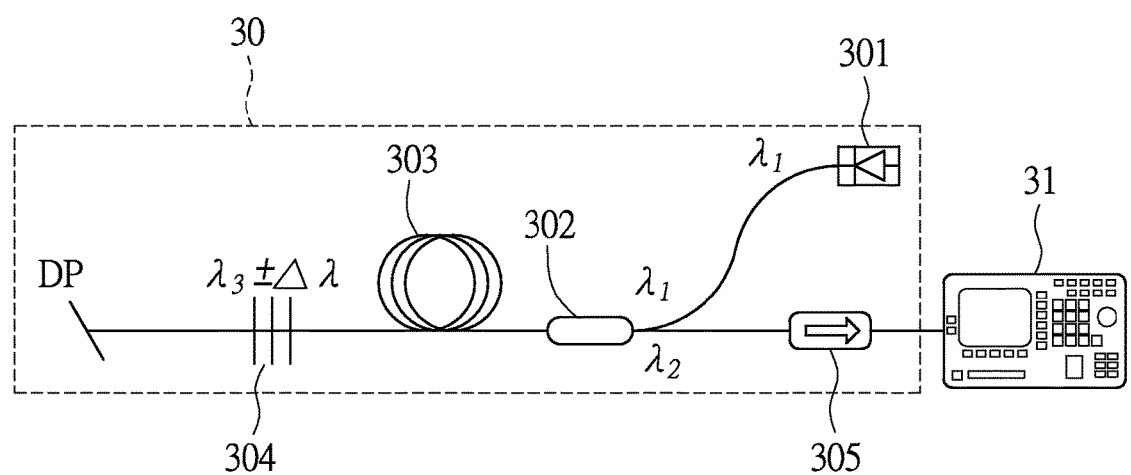
FIG. 5 shows a schematic diagram of a system of a light source device according to another embodiment of the present disclosure.

The following describes another embodiment of the light source device. FIG. 5 shows a schematic diagram of a system of a light source device according to another embodiment of the present disclosure. Compared to the light source device 10 of FIG. 1, the light source device 30 of FIG. 5 does not have an optical circulator. DP connected to the second terminal of the temperature compensated optic fiber Bragg grating 304 is a fiber termination. In such a configuration, the light source device 30 is a single-pass backward architecture.

Additionally, the pump laser 301, the wavelength division multiplexer 302, the temperature compensated optic fiber Bragg grating 304, the optical isolator 305, and the optical spectrum analyzer 31 are respectively analogous to the pump laser 101, the wavelength division multiplexer 102, the temperature compensated optic fiber Bragg grating 104, the optical isolator 106 and the optical spectrum analyzer 11 of FIG. 1, and are therefore not further describe herein.

Figure 6:
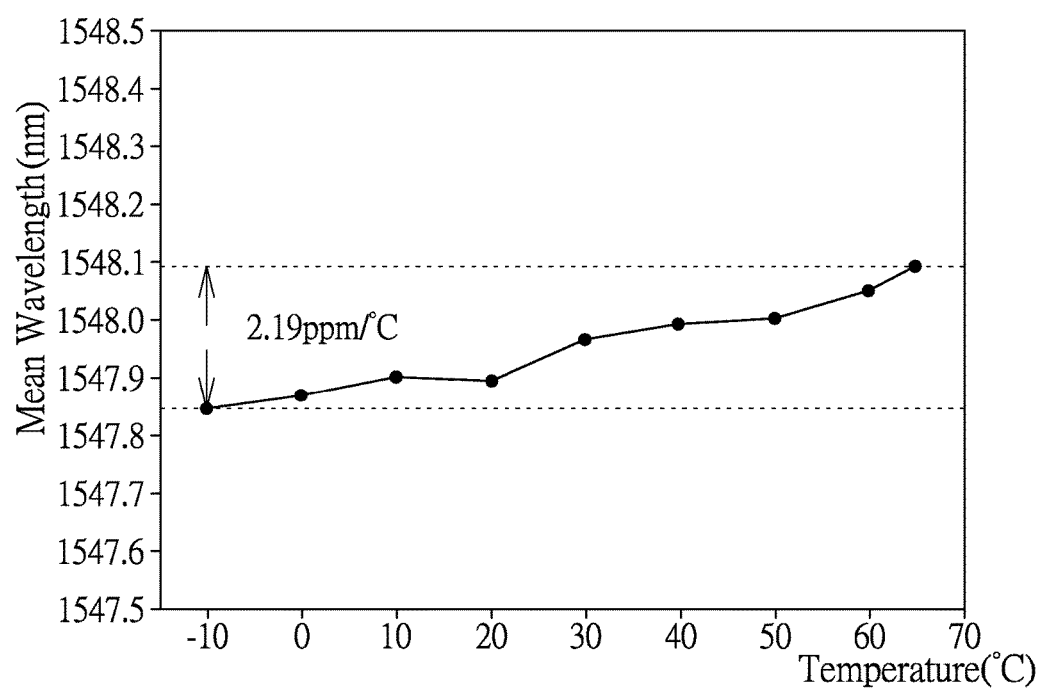
FIG. 6 shows mean wavelengths of light beams emitted by the light source device of the embodiment shown in FIG. 5 as a function of temperature.

Next, FIG. 6 shows mean wavelengths of light beams emitted by the light source device of the embodiment shown in FIG. 5 as a function of temperature. In FIG. 6, when the light source device 30 of FIG. 5 is operated in an environment between −10 and 65 degrees Celsius, its mean wavelength stability reached 2.19 ppm per degree Celsius.

Figure 7:
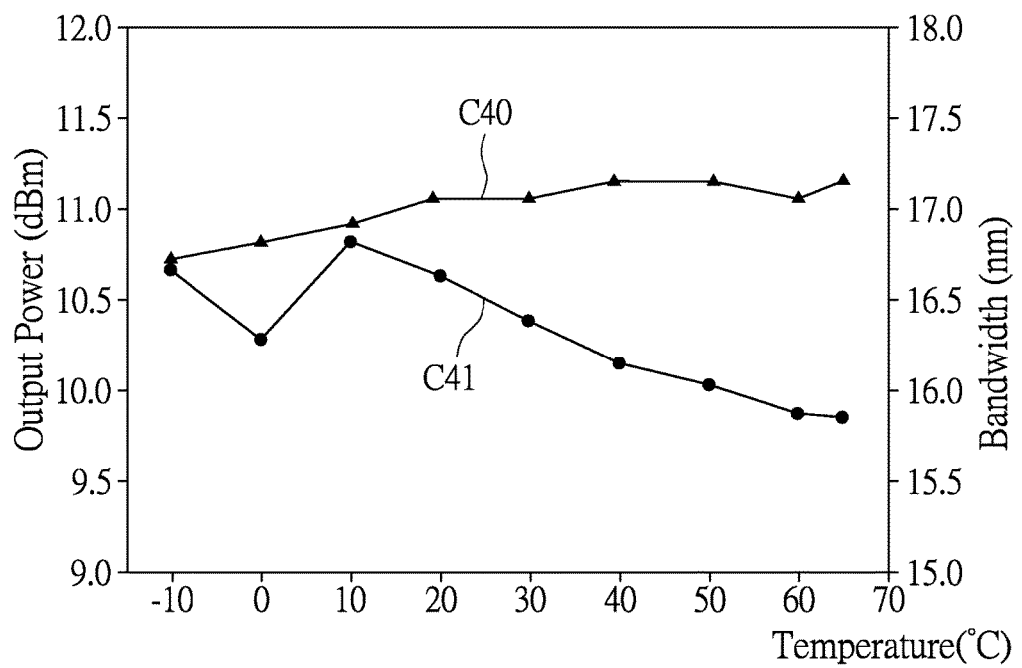
FIG. 7 shows bandwidth and power of light beams emitted by the light source device of the embodiment shown in FIG. 5 as a function of temperature.

Next, FIG. 7 shows bandwidth and power of light beams emitted by the light source device of the embodiment shown in FIG. 5 as a function of temperature. In FIG. 7, curve C40 shows the bandwidths of the light beam outputted by the light source device 30 of FIG. 5 at different temperatures. Curve C41 shows the different output power of the light beam outputted by the light source device 30 of FIG. 5 at different temperatures. It can be seen from FIG. 7 that the light source device 30 of FIG. 5, in an environment between −10 and 65 degrees Celsius, can maintain 3 dB bandwidths of light beams around 17 nanometers, and that the output power of the light beam varies by 1 dB.

The following describes system stability of the light source device in FIG. 5 to environmental radiation. For example, under radiation influence of $Co^{60}$ γ-radiation, the super-fluorescent fiber light source is affected by radiation-induced-attenuation (RIA), including radiation induced power loss and mean wavelength drift.

Next, the light source device in FIG. 5 whose rare-earth doped fiber 303 is a commercially available Erbium-doped fiber HG980, was tested for performance stability under radiation. Here only HG980 was under radiation, and the remaining components of the light device 30 was outside of the radiation room through single-mode fiber connections. Each of the two ends of the HG980 were spliced with a 25-meter of single mode optic fiber to connect to the wavelength division multiplexer 302 and the temperature compensated optic fiber Bragg grating 304 was placed outside of radiation room. Radiation test was performed using a Gamma radiation source with a dosage rate of 5 Krad per hour up to a 30 Krad total dosage. Measurement data was collected in real time through a computer controlled optical spectrum analyzer 31.

Critical parameters for a light source device are mean wavelength stability and output optical power loss. Bandwidth variation is a lesser effect under radiation. It was well known that the most sensitive component under radiation of a broadband ASE fiber light source is the rare-earth doped fiber, and for a commercially available erbium-doped fiber such as HG980 without any special design for radiation hardening, the typical power loss is greater than 3 dB, and the mean wavelength drift is over one thousand ppm for space radiation accumulated over a typical spacecraft life (Space Radiation Effects on Erbium-Doped Fiber Devices: Sources, Amplifiers, and Passive Measurements, by G. M. Williams and E. J. Fribeles, 1998).

Figure 14:
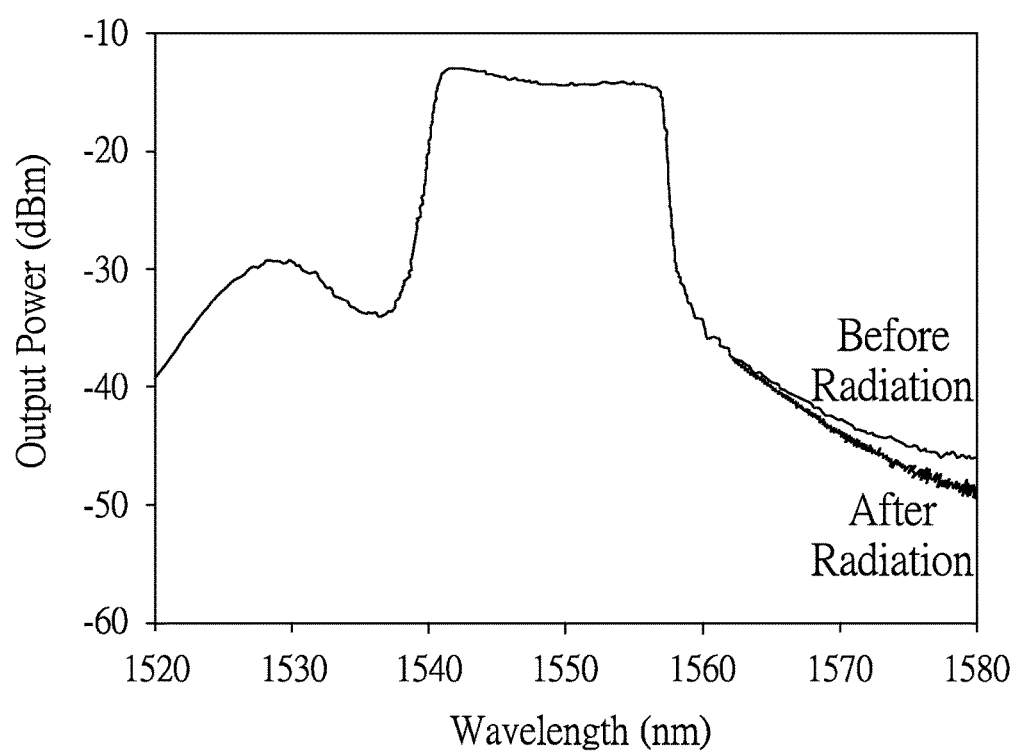
FIG. 14 shows power output with respect to changing environmental radiation of a system of the light source device of FIG. 5.
Figure 15:
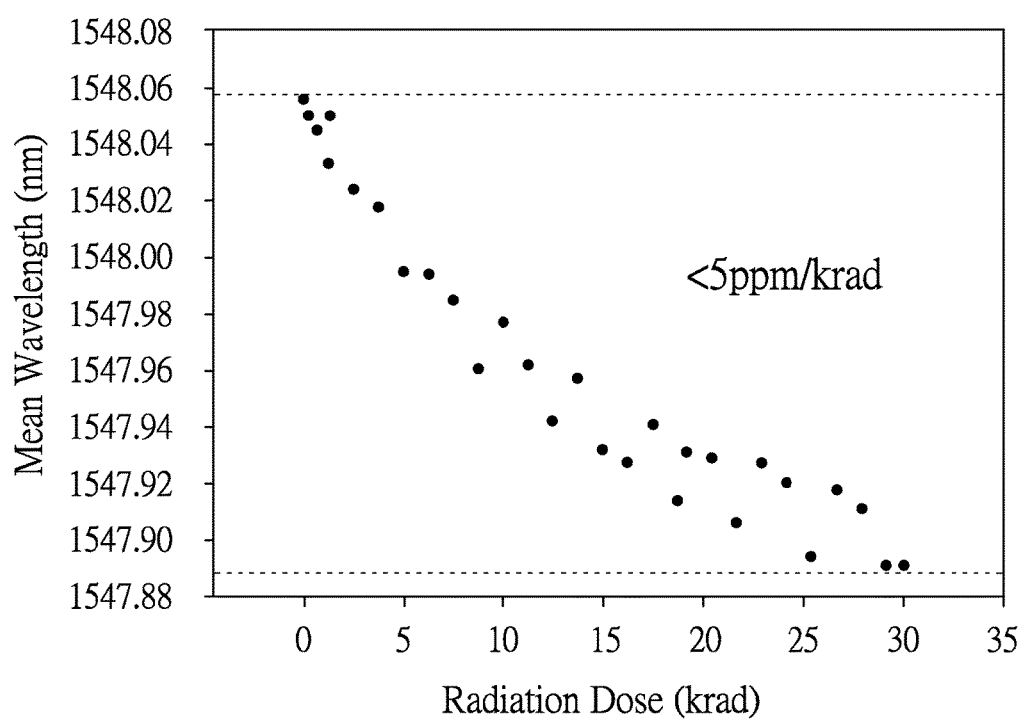
FIG. 15 shows mean wavelength with respect to changing environmental radiation of a system of the light source device of FIG. 5.
Figure 16:
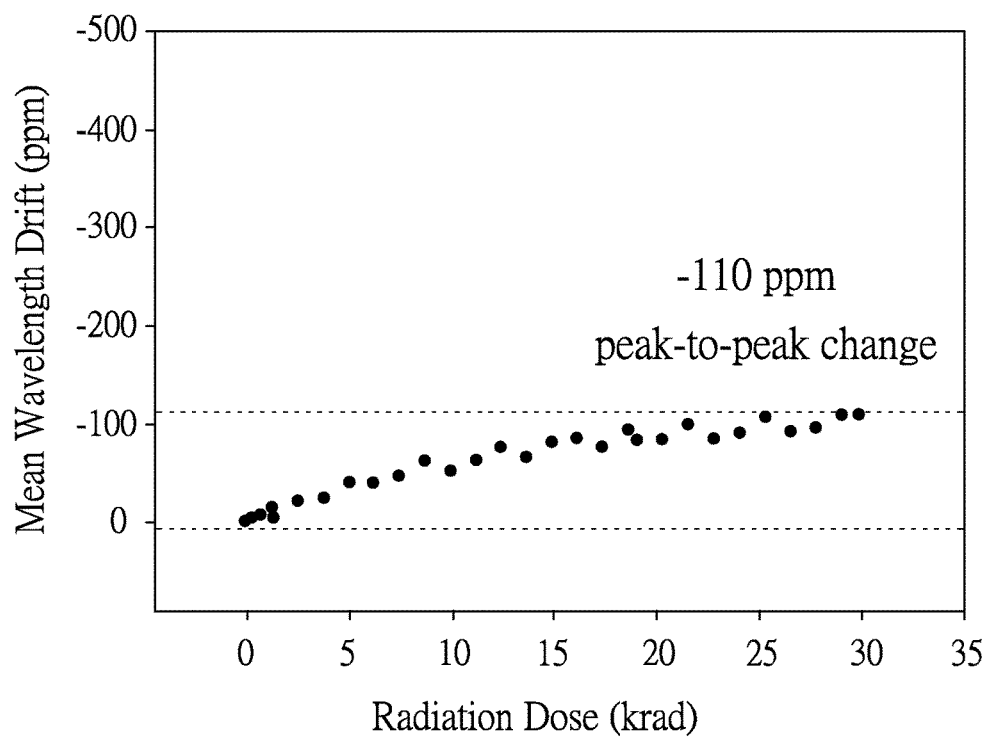
FIG. 16 shows mean wavelength drift with respect to changing environmental radiation of a system of the light source device of FIG. 5.
Figure 17:
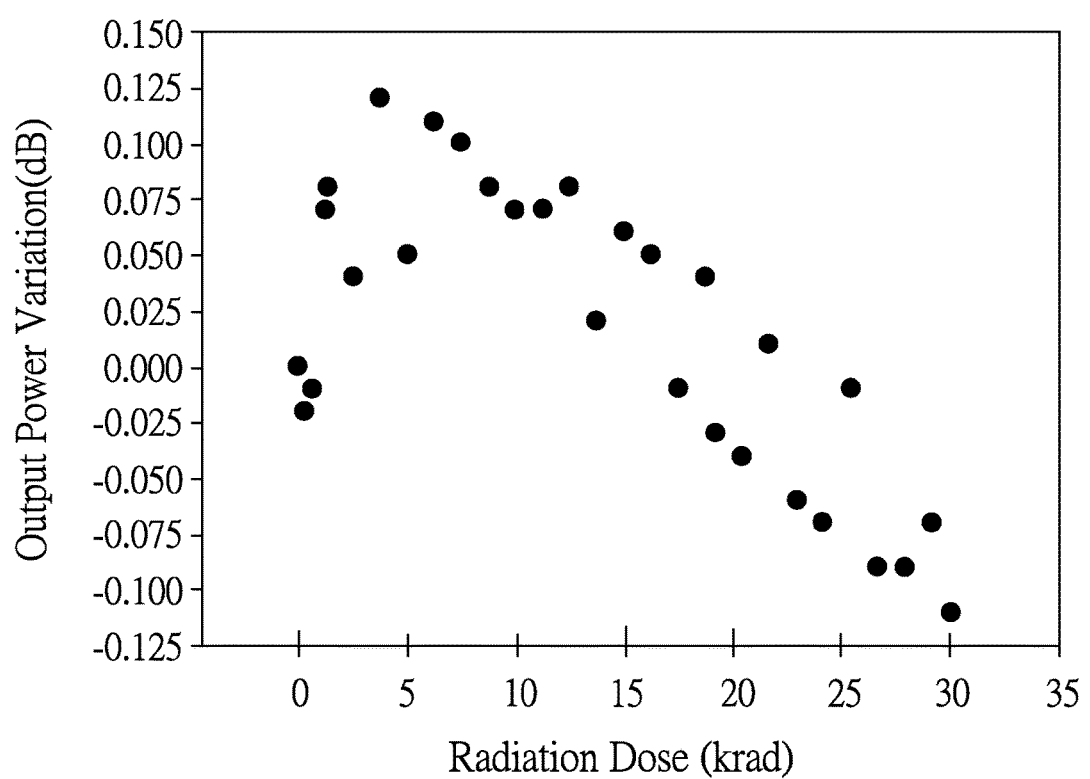
FIG. 17 shows output power variation with respect to changing environmental radiation of a system of the light source device of FIG. 5.
Figure 18:
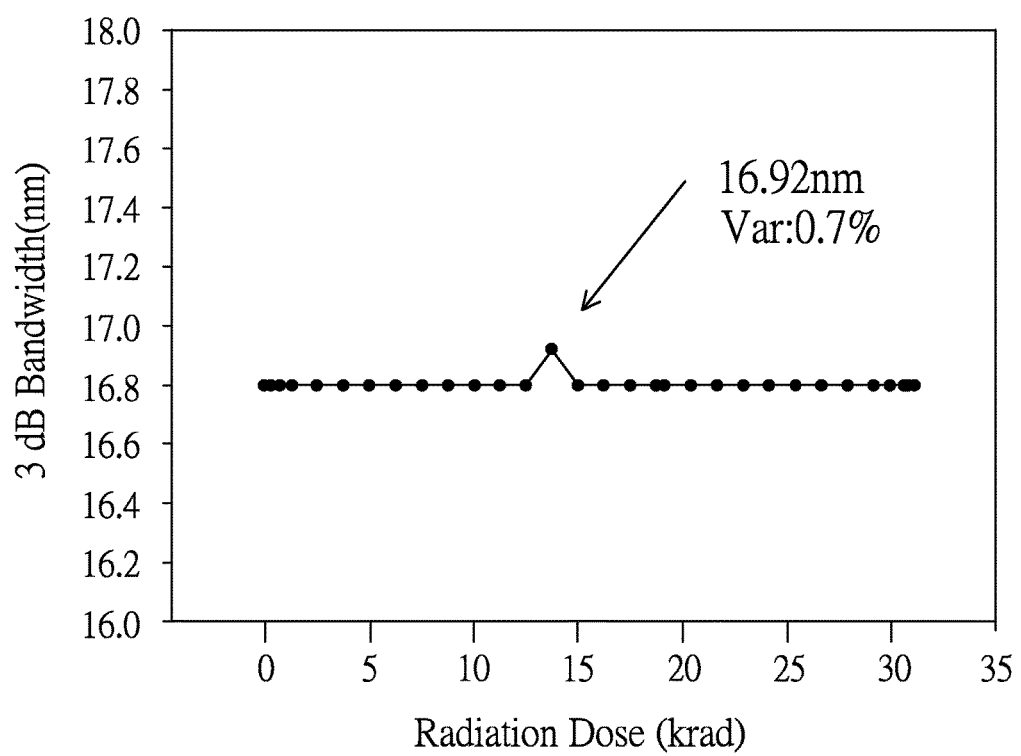
FIG. 18 shows 3 dB bandwidth with respect to changing environmental radiation of a system of the light source device of FIG. 5.

Test results on spectral changes of the light source device described above with erbium doped fiber HG980 under radiation is revealed in FIG. 14. Little impact is observed between 1520 nm and 1560 nm, while loss is observed between 1560 nm and 1580 nm. Mean wavelength can be derived from the spectral plots captured at various dosage levels. FIGS. 15 and 16 show the mean wavelength measurement and its relative changes with respect to ppm. It is clear that over the 30Krad total radiation, the peak to peak mean wavelength change was about 110 ppm (decreased from a longer wavelength to a shorter wavelength), which is <4 ppm/Krad. More astonishingly, the peak to peak output power variation is only 0.22 dB(<3%) as shown in FIG. 17, and 3 dB bandwidth has less than 1% change. This is the first time, by using a commercial non-rad-hard erbium-doped fiber, to be able to demonstrate stability in both power, mean wavelength, and 3 dB bandwidth simultaneously over a 30 Krad radiation dosage. Such a dosage is about three to five times of typical radiation dosage experienced by a low-earth orbit spacecraft over its life.

[Another Embodiment of Light Source Device]

Figure 8:
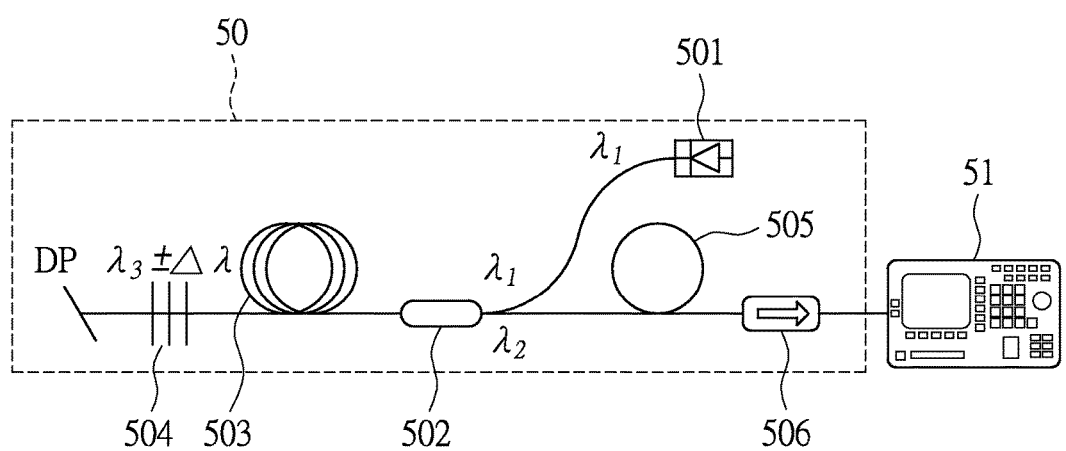
FIG. 8 shows a schematic diagram of a system of a light source device according to another embodiment of the present disclosure.

Next, another embodiment of the light source device is introduced. FIG. 8 shows a schematic diagram of a system of a light source device according to another embodiment of the present disclosure. Compared to the light source device 30 of FIG. 5, the light source device 50 of FIG. 8 further has an optic fiber absorber 505 to act as a high pass filtering element. The second terminal of the wavelength division multiplexer 502 is connected to a first terminal of the optic fiber absorber 505 through at least a section of optic fiber. The first terminal of the optical isolator 506 is connected to a second terminal of the optic fiber absorber 505 through at least a section of optic fiber.

In the present embodiment, the optic fiber absorber 505 can be replaced by a temperature compensated rare-earth doped fiber such as an erbium doped optic fiber absorber. Namely, the high pass filtering element can have a temperature compensating function, mainly to suppress the band of the light beam to not drift due to temperature change.

Additionally, the optic fiber absorber likewise is mounted to a carbon fiber composite substrate. The optic fiber absorber is attached to the upper surface of the lamina 211 of the laminate 21 as shown in FIG. 2B. The optic fiber absorber 505 has a wave filtering and output stabilizing effect. Therefore the light beams having mean wavelengths in the fourth band $\lambda 4$ (e.g. 1530 nanometers) can be effectively suppressed, and the stability of the mean wavelength is increased. In other words, the absorbance of light beams having mean wavelengths in the fourth band $\lambda 4$ by the temperature compensated optic fiber absorber 505 is greater than the absorbance of light beams having mean wavelengths in the second band $\lambda 2$ (e.g 1550 nanometers) by the temperature compensated optic fiber absorber 505.

Additionally, the pump laser 501, the wavelength division multiplexer 502, the rare-earth doped optic fiber 503, the temperature compensated optic fiber Bragg grating 504, the optical isolator 506, and the optical spectrum analyzer 51 shown in FIG. 8 are respectively analogous to the pump laser 301, the wavelength division multiplexer 302, the rare-earth doped optic fiber 303, the temperature compensated optic fiber Bragg grating 304, the optical isolator 305, and the optical spectrum analyzer 31 shown in FIG. 5, and are therefore not further described herein.

Figure 9:
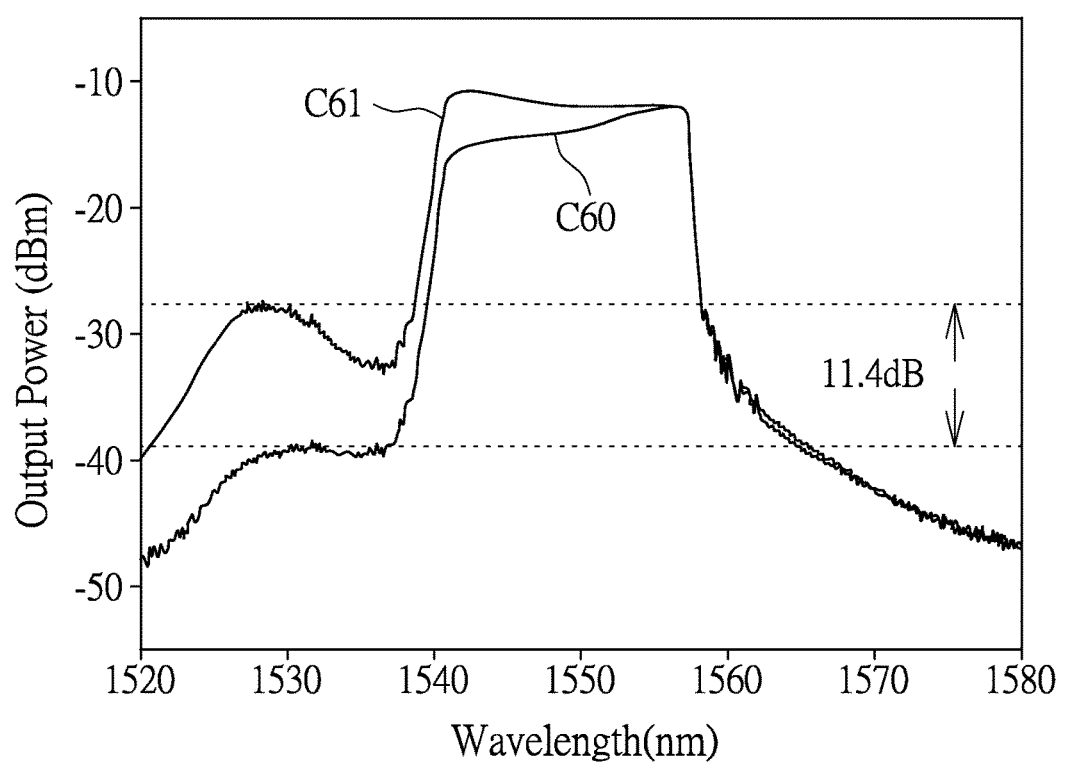
FIG. 9 shows a spectrogram of a light beam emitted by the light source device of the embodiment shown in FIG. 8 with and without a fiber absorber.

Next, FIG. 9 shows a spectrogram of a light beam emitted by the light source device of the embodiment shown in FIG. 8. In FIG. 9, curve C60 shows the power of the light beam output by the light source device 50 of FIG. 8 (having the temperature compensated optic fiber absorber 505). Curve C61 shows the power of the light beam output by the coolerless pump laser 30 of FIG. 5 (without the temperature compensated optic fiber absorber). As mentioned above, the temperature compensated optic fiber absorber 505 can effectively suppress light beams having mean wavelengths in the fourth band $\lambda_4$ (e.g. 1530 nanometers), but allows light beams having mean wavelengths in the second band $\lambda_2$ (e.g. 1550 nanometers) to pass through. Therefore, as shown in FIG. 9, with the optical fiber absorber, the power of the light beam in the 1530 nanometer peak was suppressed by 11.4 dB. The impact of adding a fiber optic absorber is only a slightly decrease in light source device output power. The 3 dB bandwidth maintains around 15 to 16 nanometers.

Figure 10:
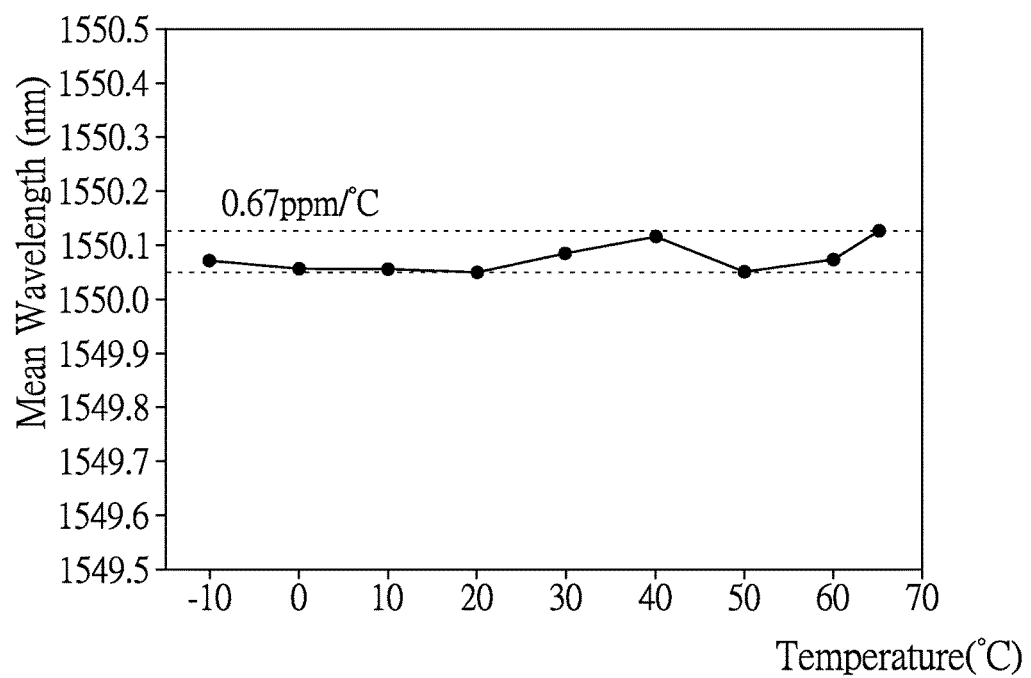
FIG. 10 shows mean wavelengths of light beams emitted by the light source device of the embodiment shown in FIG. 8 as a function of temperature.

Next, FIG. 10 shows mean wavelengths of light beams emitted by the light source device of the embodiment shown in FIG. 8 as a function of temperature. In FIG. 10, when the light source device 50 of FIG. 8 is operated in an environment between −10 and 65 degrees Celsius, its mean wavelength variation reaches 0.67 ppm per degree Celsius which is about 50 ppm over the 75 degree Celsius temperature range.

[Another Embodiment of Light Source Device]

Figure 11:
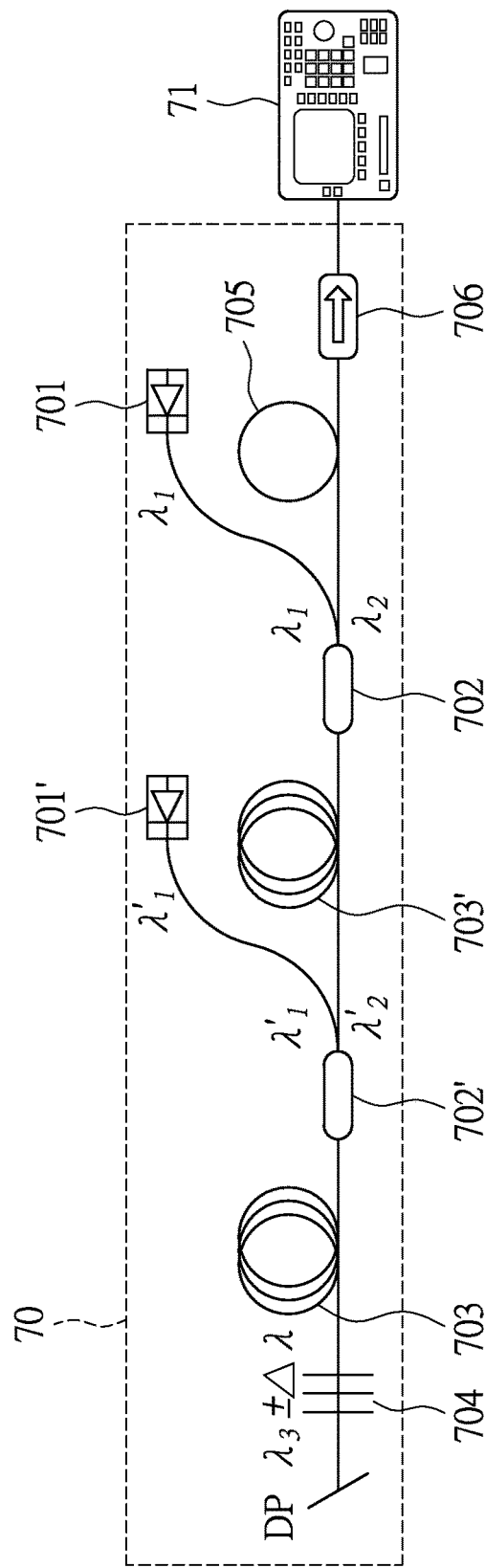
FIG. 11 shows a schematic diagram of a system of a light source device according to another embodiment of the present disclosure.
Figure 12:
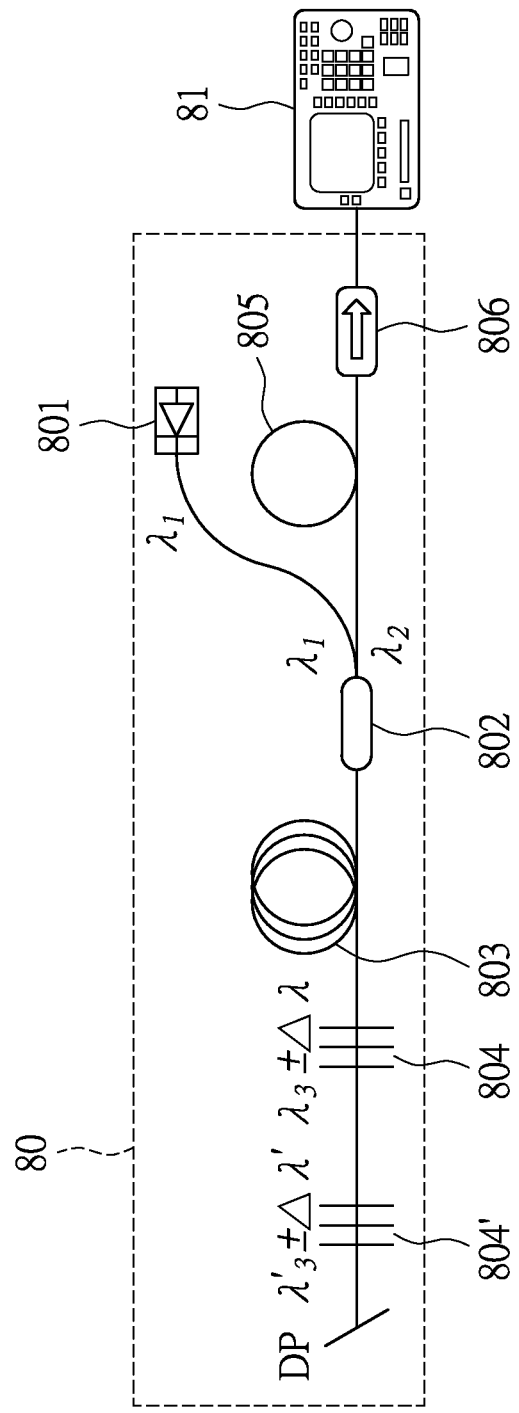
FIG. 12 shows a schematic diagram of a system of a light source device according to another embodiment of the present disclosure.

The following describes another embodiment of the light source device. FIG. 11 shows a schematic diagram of a system of a light source device according to another embodiment of the present disclosure. Compared to the light source device 50 of FIG. 8, the light source device 70 of FIG. 11 has a pump laser 701, a rare-earth doped fiber such as erbium doped optic fiber 703' and a wavelength division multiplexer 702'. A first terminal of the rare-earth doped optic fiber 703' is connected to a common terminal of the wavelength division multiplexer 702 through at least a section of optic fiber. The first terminal of the temperature compensated erbium doped optic fiber 703' is connected to a second terminal of the wavelength division multiplexer 702' through at least a section of optic fiber. The first terminal of the rare-earth doped optic fiber 703 is connected to the common terminal of the wavelength division multiplexer 702' through at least a section of optic fiber. A first terminal of the wavelength division multiplexer 702' is connected to the pump laser 701' through at least a section of optic fiber.

In the present embodiment, the pump laser 701, the wavelength division multiplexer 702, the rare-earth doped optic fiber 703, the temperature compensated optic fiber Bragg grating 704, the optic fiber absorber 705, the optical isolator 706, and the optical spectrum analyzer 71 are respectively analogous to the pump laser 501, the wavelength division multiplexer 502, the rare-earth doped optic fiber 503, the temperature compensated optic fiber Bragg grating 504, the optic fiber absorber 505, the optical isolator 506, and the optical spectrum analyzer 51 of FIG. 8, and are therefore not further described herein.

The pump laser 701' provides a light beam having a mean wavelength in the fifth band $\lambda'1$. The functions of the rare-earth doped optic fiber 703' and the rare-earth doped optic fiber 703 are similar. The first terminal of the wavelength division multiplexer 702' receives light beams having mean wavelengths in the fifth band $\lambda'1$, and allows light beams having mean wavelengths in the fifth band $\lambda'1$ to pass through to a common terminal thereof. The common terminal of the wavelength division multiplexer 702' receives light beams amplified by the rare-earth doped optic fiber 703, and allows light beams having mean wavelengths in the sixth band $\lambda'2$ to pass from the common terminal thereof to the second terminal thereof. The wavelengths of the fifth band $\lambda'1$ and the sixth band $\lambda'2$ can respectively be the same as the wavelengths of the first band $\lambda 1$ and the second band $\lambda 2$, to increase the effect of amplifying the light beams. Alternately, the wavelengths of the fifth band $\lambda'1$ and the sixth band $\lambda'2$ can respectively be the slightly different from the wavelengths of the first band $\lambda 1$ and the second band $\lambda 2$, the light source device 70 still realizing the effect of wavelength selection.

[Another Embodiment of Light Source Device]

In the present embodiment, the pump laser 801, the wavelength division multiplexer 802, the rare-earth doped optical fiber such aserbium doped optic fiber 803, the temperature compensated optic fiber Bragg grating 804, the optic fiber absorber 805, the optical isolator 806, and the optical spectrum analyzer 81 are respectively analogous to the pump laser 501, the wavelength division multiplexer 502, the rare-earth doped optic fiber 503, the temperature compensated optic fiber Bragg grating 504, the optic fiber absorber 505, the optical isolator 506, and the optical spectrum analyzer 51 of FIG. 8, and are therefore not further described.

The pump reflector fiber grating 804' can be replaced by a temperature compensated pump reflector fiber grating. The temperature compensated pump reflector fiber grating likewise is mounted to a carbon fiber composites substrate. The pump reflector fiber grating of the temperature compensated optic fiber Bragg grating is attached to the upper surface of the lamina 211 of the laminate 21 of FIG. 2B. When a light beam enters from the first terminal of the pump reflector fiber grating 804', the pump reflector fiber grating 804' reflects light beam having a mean wavelength in another specific band $\lambda'_3 \pm \Delta\lambda'$ to the first terminal thereof, and allows a light beam having a mean wavelength outside the other specific band $\lambda'_3 \pm \Delta\lambda'$ to pass from the first terminal thereof to the second terminal thereof. When a light beam enters from the second terminal of the pump reflector fiber grating 804', the pump reflector fiber grating 804' reflects a light beam having a mean wavelength in another specific band $\lambda'_3 \pm \Delta\lambda$ to the second terminal thereof, and allows a light beam having a mean wavelength outside the other specific band $\lambda'_3 \pm \Delta\lambda$ to pass to the first terminal thereof. In other words, the pump reflector fiber grating 804' serves as a bandpass reflector device for reflecting light beams having mean wavelengths in the another specific band $\lambda'_3 \pm \Delta\lambda'$.

In the present embodiment, the wavelengths of $\lambda'_3$ and $\Delta\lambda'$ are respectively the same as those of $\lambda_3$ and $\Delta\lambda$, such that the pump reflector fiber grating 804' reflects light beams having mean wavelengths in a specific band, which in turn allows residue power of light beams to be reused. The light beam reflected by the pump reflector fiber grating 804' passes through the rare-earth doped optic fiber 503, and uses the rare-earth doped optic fiber 503 again to produce an amplification effect, and produce again an amplified light beam. However, the present disclosure is not limited to the wavelengths of $\lambda'_3$ and $\Delta\lambda'$ of the present embodiment. The wavelengths of $\lambda'_3$ and $\Delta\lambda'$ can be different from those of the wavelengths of $\lambda_3$ and $\Delta\lambda$, realizing the effect of wavelength selection.

[Embodiment of Fiber Optic Gyroscope]

Figure 13:
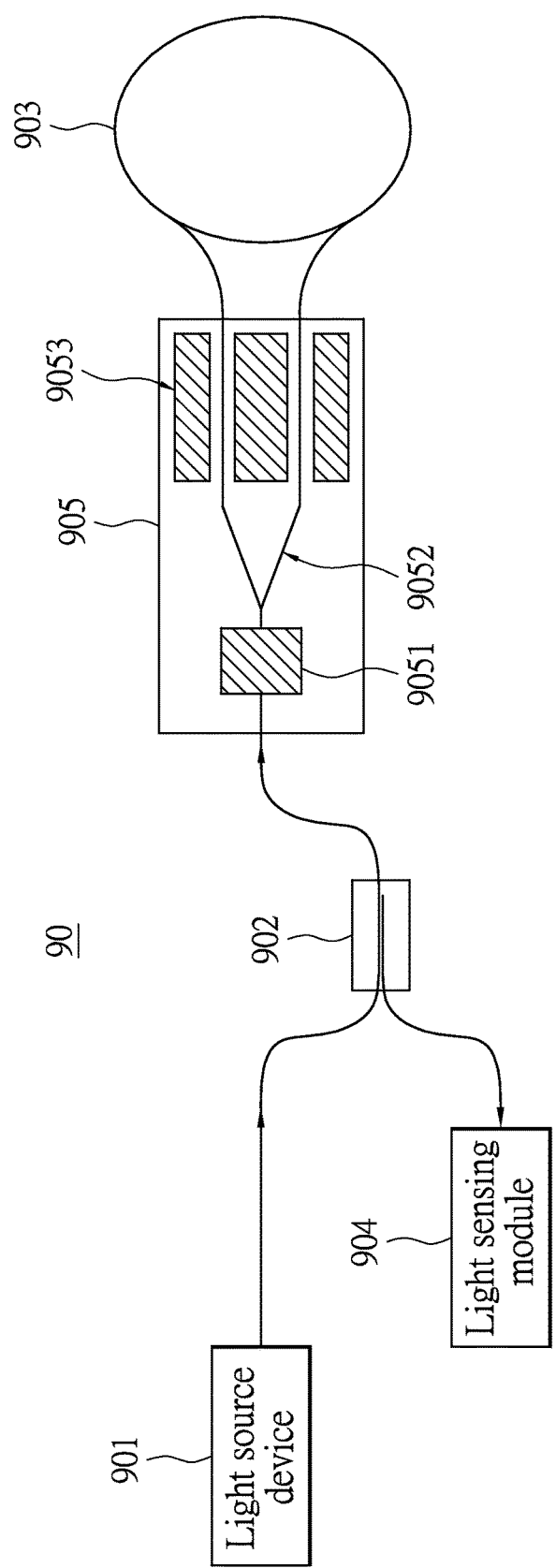
FIG. 13 shows a schematic diagram of a system of a fiber optic gyroscope with a Light Source Device according to an embodiment of the present disclosure.

As mentioned above, the light source device of the present disclosure can be applied to fiber optic gyroscopes, fiber optic sensors, or other optical communication modules. The following describes an embodiment of a fiber optic gyroscope. FIG. 13 shows a schematic diagram of a system of a fiber optic gyroscope according to an embodiment of the present disclosure. The fiber optic gyroscope 90 includes a plurality of sections of optic fibers, a light source device 901, a 3 dB coupler 902, an optic fiber coil 903, a light sensing module 904, and a multifunction integrated optic chip (or module) 905. The light sensing module 904 includes a photodetector, pre-amplifier, and signal-processing electronics connecting to multi-function integrated optic chip. The multifunction integrated optical chip (or module) 905 includes polarizers 9051, a Y splitter 9052 and a phase modulator 9053. A first terminal of the 3 dB coupler 902 is connected to the light source device 901 through at least a section of optic fiber. A second terminal of the 3 dB coupler 902 is connected to the light sensing module 904 through at least a section of optic fiber. A third terminal of the 3 dB coupler 902 is connected to an input terminal of the multifunction integrated optical chip(or module) 905 through at least a section of optic fiber. A first output terminal of the multifunction integrated optical chip(or module) 905 is connected to a first terminal of the optic fiber coil 903 through at least a section of the optic fiber, and a second output terminal of the multifunction integrated optical chip (or module) 905 is connected to a second terminal of the optic fiber coil 903 through at least a section of the optic fiber.

Of particular note, the light source device 901 can be the light source device of the present disclosure. Additionally, a person skilled in the art can understand and operate the fiber optic gyroscope 90 based on existing techniques, details of which are not further described herein.

[Potential Advantages of the Present Disclosure]

In summary of the above, compared to the conventional light source devices employing pump lasers with TEC, the light source device provided by the present disclosure using a coolerless pump and achieves a far more stable mean wavelength over temperature, and demonstrated excellent performance in both mean wavelength and power stability under radiation. The light source device provided by the present disclosure is therefore applicable to space applications such as fiber optic gyroscopes for space platform navigation, stabilization and/or altitude control whereas power consumption and space radiation are key design parameters and constraints.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. An environmental robust fiber light source device comprising:
    a plurality of optic fiber sections;
    a coolerless pump laser for providing a first light beam having a mean wavelength in a first band;
    a wavelength division multiplexer having a first terminal, a second terminal and a common terminal, wherein the first terminal thereof is connected to the pump laser through at least one of the optic fiber sections, the first terminal thereof receives the first light beam, for allowing the first light beam having a mean wavelength in the first band to pass from the first terminal thereof to the common terminal thereof, and allowing a second light beam having a mean wavelength in a second band to pass through from the common terminal thereof to the second terminal thereof;
    an optical isolator, being a single-pass uni-directional element, having a first terminal and a second terminal, wherein the first terminal thereof is connected to the second terminal of the wavelength division multiplexer through at least one of the optic fiber sections, the first terminal thereof receives the second light beam from the second terminal of the wavelength division multiplexer, for allowing the second light beam to pass through from the first terminal thereof to the second terminal thereof;
    an amplified spontaneous emission unit, having a first terminal and a second terminal, wherein the first terminal thereof is connected to the common terminal of the wavelength division multiplexer through at least one of the optic fiber sections, for receiving the first light beam having a mean wavelength in the first band and producing an amplifying effect, for producing a third light beam in both directions, to both the first and the second terminal, and the third beam spectral contents falling within the second beam and has no overlap to that of the first beam thereof;
    a bandpass reflector having a first terminal and a second terminal, wherein the first terminal thereof is connected to the second terminal of the amplified spontaneous emission unit through at least one of the optic fiber sections, and the second terminal thereof is connected to at least one of the fiber optic sections, the first terminal thereof is configured to receive the third light beam from the second terminal of the amplified spontaneous emission unit, to reflect the third light beam having a mean wavelength in a specific band to the first terminal thereof, and to allow the remaining of the third light beam mean wavelength to pass through from the first terminal thereof to the second terminal thereof; and
    a high pass filtering element having a first terminal and a second terminal, wherein the first terminal thereof is configured to receive the second light beam having a mean wavelength in the second band and high pass filter the second light beam and output the second light beam to the second terminal thereof, for suppressing the second light beam having the mean wavelength outside the specific band defined by the bandpass reflector;
    wherein the second terminal of the amplified spontaneous emission unit receives a reflected fourth light beam from the first terminal of the bandpass reflector, for producing part of the second light beam to the first terminal thereof;
    wherein the first terminal of the optical isolator is connected to the second terminal of the wavelength division multiplexer through the high pass filtering element, the first terminal of the high pass filtering element is connected to the second terminal of the wavelength division multiplexer through at least one of the optic fiber sections, and the second terminal of the high pass filtering element is connected to the first terminal of the optical isolator through at least one of the optic fiber sections.

2. The light source device according to claim 1, wherein the bandpass reflector is a temperature compensated bandpass reflector.

3. The light source device according to claim 2, wherein the temperature bandpass reflector is a temperature compensated optic fiber Bragg grating.

4. The light source according to claim 1, wherein the amplified spontaneous emission unit is a rare-earth doped optic fiber or a temperature compensated rare-earth doped optic fiber.

5. The light source device according to claim 1, wherein the high pass filtering element is an optic fiber absorber or temperature compensated optic fiber absorber.

6. The light source device according to claim 1, wherein the specific band defined by the bandpass reflector falls in between 1535 nanometers to 1565 nanometers, and the first band is centering around 800 nanometers, 980 nanometers or 1480 nanometers, whereas the second band 1550 nanometers.

7. The light source device according to claim 1, wherein the optic fiber section connected to the second terminal of the bandpass reflector has a fiber termination or a reflecting face, and the reflecting face is an active, partially passive, or totally reflective one.

8. The light source device according to claim 3, wherein the optic fiber section connected to the second terminal of the temperature compensated bandpass reflector has a fiber termination or a reflecting face, and the reflecting face is an active, partially passive, or totally reflective one.

9. The light source device according to claim 1, further comprising:
    an optical circulator having a first terminal, a second terminal and a third terminal, wherein the first terminal thereof is connected to the third terminal thereof through at least one of the optic fiber sections, the second terminal thereof is connected to the second terminal of the bandpass reflector through at least one of the optic fiber sections, for receiving the second light beam having the mean wavelength outside the specific band from the bandpass reflector, and reflecting the second light beam having the mean wavelength in the specific band;
    wherein the second terminal of the bandpass reflector is configured to receive the second light beam having the mean wavelength outside the specific band from the optical circulator, reflecting the second light beam having the mean wavelength in the specific band, and allowing the second light beam having the mean wavelength outside the specific band to pass from the second terminal thereof to the first terminal thereof.

10. The light source device according to claim 4, further comprising:

an additional pump laser for providing a fifth light beam having a mean wavelength in a third band;

an additional wavelength division multiplexer having a first terminal, a second terminal and a common terminal, wherein the first terminal thereof is connected to the additional pump laser through at least one of the optic fiber sections, and the common terminal thereof is connected to the amplified spontaneous emission unit through at least one of the optic fiber sections; and an additional amplified spontaneous emission unit having a first terminal and a second terminal, wherein the first terminal thereof is connected to the first terminal of the wavelength division multiplexer through at least one of the optic fiber sections, and the second terminal thereof is connected to the second terminal of the additional wavelength division multiplexer through at least one of the optic fiber sections.

11. The light source device according to claim 4, further comprising:

a pump reflector fiber grating, having a first terminal and a second terminal, wherein the first terminal thereof is connected to the second terminal of the bandpass reflector through at least one of the optic fiber sections, the second terminal thereof is connected to at least one of the optic fiber sections, the first terminal thereof is configured to receive the second light beam having the mean wavelength outside the specific band from the second terminal of the bandpass reflector, reflect the second light beam having a mean wavelength in an another specific band, and allow the second light beam having the mean wavelength outside the another specific band to pass from the first terminal thereof to the second terminal thereof.

* * * * *